United States Patent [19]

Hrdlicka

[11] 4,014,128
[45] Mar. 29, 1977

[54] COMBINATION FISHING POLE HOLDER AND TACKLE BOX

[76] Inventor: Theodore Frederick Hrdlicka, 6486 S. Crocker, Littleton, Colo. 80120

[22] Filed: June 25, 1976

[21] Appl. No.: 700,058

[52] U.S. Cl. .............................. 43/21.2; 43/54.5 R; 248/528; 248/529

[51] Int. Cl.² ..................................... A01K 97/10

[58] Field of Search ............... 206/315; 43/54.5 R, 43/21.2; 312/237; 220/85 R; 248/528, 529

[56] References Cited

UNITED STATES PATENTS

| 2,596,403 | 5/1952 | Hoffman | 43/21.2 |
|---|---|---|---|
| 3,159,366 | 12/1964 | Knight | 43/21.2 |
| 3,327,978 | 6/1967 | Gates | 43/21.2 |
| 3,555,719 | 1/1971 | Butler | 43/21.2 |
| 3,636,649 | 1/1972 | Paiva | 43/21.2 |

FOREIGN PATENTS OR APPLICATIONS 24,018  1961  Japan ..................... 43/21.2

Primary Examiner—George E. Lowrance
Assistant Examiner—Joseph M. Moy

[57] ABSTRACT

A pair of brackets hingedly mounted to the lid of any conventional tackle box so that the brackets fold down so as to be flush with the lid of a tackle box when not in use and, when the brackets are opened so as to stand upright from the lid of a tackle box, one bracket is provided with a round hole for supporting the end of a fishing pole and the other bracket is provided with a slot on its top end for supporting a fishing pole at an angle upwardly from the water.

3 Claims, 4 Drawing Figures

U.S. Patent  Mar. 29, 1977  4,014,128
FIG _1_
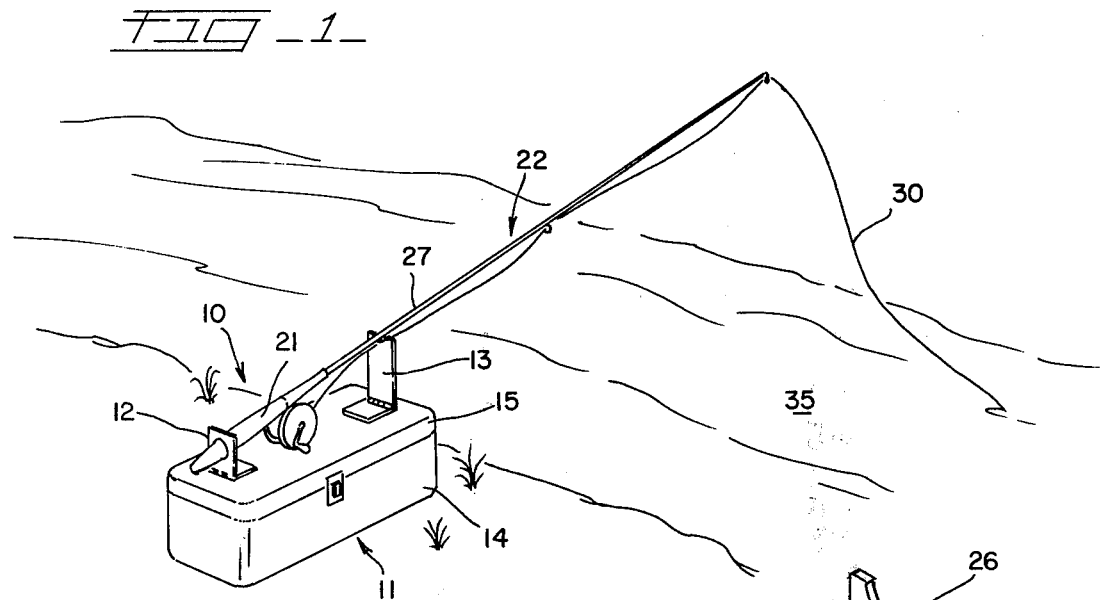
FIG _2_
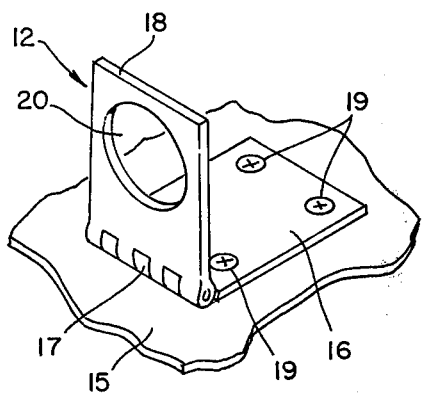
FIG _3_
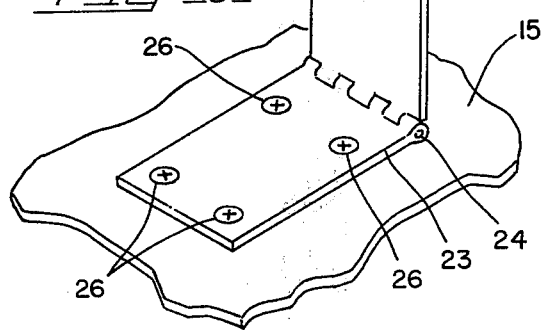
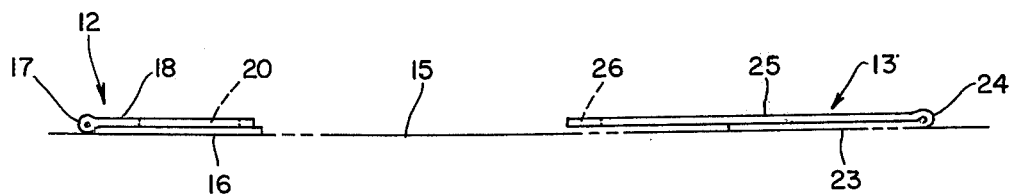
FIG _4_

COMBINATION FISHING POLE HOLDER AND TACKLE BOX

BACKGROUND OF THE INVENTION

1. Field of the Invention

This invention relates to a combination fishing pole holder and tackle box for use by a fisherman so as to have a fishing pole holder conveniently accessible as part of a tackle box.

2. Description of the Prior Art

It has always been a nuisance for fishermen to conveniently prop a fishing pole with the fishing line and bait dangling in the water so as to temporarily leave the fishing spot for one reason or another or to have more than one fishing pole utilized simultaneously. Commonly employed methods include the use of rocks or other objects to prop up a fishing pole, the use of separate fishing pole holders which must be stuck into or supported on the ground, and other similar devices, but such devices must be individually stored and transported to and from a fishing spot so as to require additional storage space and inconvenience to the user. In any case, the fisherman usually carries a tackle box containing various fishing supplies, so that a collapsible fishing pole holder attached directly to the lid of a tackle box would be welcomed with a high rate of acceptance by fishermen.

SUMMARY OF THE INVENTION

The present invention provides a combination fishing pole holder and tackle box with a fishing pole holder collapsibly attached to the lid of a tackle box.

It is a feature of the present invention to provide a combination fishing pole holder and tackle box.

A further feature of the present invention provides a combination fishing pole holder and tackle box which is easy to use and reliable and efficient in operation.

Yet still a further feature of the present invention provides a combination fishing pole holder and tackle box which is of a rugged and durable construction and which, therefore, may be guaranteed by the manufacturer to withstand long and continual usage.

An additional feature of the present invention provides a combination fishing pole holder and tackle box which is simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the combination fishing pole holder and tackle box; and FIG. 2 is a perspective view of the fishing rod holding bracket in the open position; and FIG. 3 is a perspective view of the fishing rod support bracket in the open position; and FIG. 4 is a side view of the pair of brackets in a closed or collapsed position.

DESCRIPTION OF THE PREFERRED EMBODIMENT

Referring now to the drawings in detail, there is illustrated a preferred form of the combination fishing pole holder and tackle box constructed in accordance with the principles of the present invention and which is designated generally in its entirety by the reference numeral 10 and which is comprised of a conventional tackle box 11, a fishing rod holding bracket 12, a fishing rod support bracket 13, and associated hardware and components as will be later described.

The tackle box 11 is any conventional type fishing tackle box consisting of a bottom section 14 for containing fishing supplies, such as bait, fishing hooks, and the like, and a lid 15.

The fishing rod holding bracket 12 is constructed of durable material, such as steel, and consists of a rectangular bottom plate 16 attached on one end by means of a hinge 17 to one end of the top plate 18. The bottom plate 16 is secured to the lid 15 in any conventional way, such as by welding, rivets, or, as shown in FIG. 2, by means of machine screws 19 and is disposed toward one end of the lid 15 with the hinged portion 17 positioned parallel to a narrow side or width of the lid 15. The top plate 18 is further provided with a round through hole 20 with an inside diameter large enough to rest therein the handle portion 21 of a fishing pole 22.

The fishing rod support bracket 13 is constructed similarly to the bracket 12 and consists of a bottom plate 23 which is hingedly attached on one end by means of the hinge 24 to one end of the top plate 25. The bottom plate 23 is securely affixed to the lid 15 in a conventional way, such as by welding, rivets, or, as shown in FIG. 3, by means of machine screws 26 and is positioned on the opposite end of the lid 15 so that the top plates 18 and 25 are axially aligned and parallel with each other. The top plate 25 is longer than the top plate 18 and is provided with a circular notch 26 in the end opposed to the hinge 24 and is centrally located thereon and is provided with a diameter large enough to rest a rod 27 of a fishing pole 22.

In operation, a fisherman would carry a tackle box containing various fishing accessories along with a fishing pole to a fishing site. When it is desired to leave the fishing spot while, at the same time, leaving a fishing pole 22 at the fishing scene with the fishing cord 30 baited and dangling in the water 35 in anticipation of catching a fish thereon, the user, as shown in FIGS. 1, 2, and 3, would stand the top plates 18 and 25 in an upright position, place the handle 21 of a fishing pole 22 within the hole 20 in the fishing rod holding bracket 12 and would rest the fishing rod 27 in the notch 26 provided on the top plate 25 of the fishing rod support bracket 13. When it is desired to open the tackle box 11 or to discontinue fishing, the fishing pole 22 is removed from the brackets 12 and 13 by reversing the above described procedure and, as shown in FIG. 4, the plates 18 and 25 are folded inwardly toward each other so as to rest against the bottom plates 16 and 23 respectively so as to be parallel to and nearly flush with the lid 15, this enabling a fisherman to carry or store the combination fishing pole holder and tackle box 10 in a compact position.

There is thus described a novel combination fishing pole holder and tackle box which meets all of its stated objectives and which overcomes the disadvantages of existing techniques.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. A combination fishing pole holder and tackle box comprising, in combination:

a conventional tackle box; and a fishing rod holding bracket consisting of a rectangular bottom plate attached on one end by means of a hinge to one end of a top plate, the bottom plate secured to the lid of said tackle box in any conventional way, with said fishing rod holding bracket disposed toward one end of said lid with its hinged portion positioned parallel to a narrow side or width of said lid, with said top plate being further provided with a round through hole with an inside diameter large enough to rest therein the handle portion of a fishing pole; and a fishing rod support bracket consisting of a bottom plate hingedly attached on one end to a top plate, the bottom plate being securely affixed to the lid of said tackle box and positioned on the opposite end of said lid as the fishing rod holding bracket with the top plates of both said brackets axially aligned and parallel with each other, with further the said top plate being longer than the top plate provided on said fishing rod holding bracket and further being provided with a circular notch in its end opposed to the hinge and centrally located thereon for resting therein a fishing pole rod.

2. A combination fishing pole holder and tackle box as set forth in claim 1 wherein said fishing rod holding bracket and said fishing rod support bracket are hingedly attached to the lid of said conventional tackle box so as to be collapsible to provide a compact unit when not in use.

3. A combination fishing pole holder and tackle box as set forth in claim 1 wherein said pair of brackets affixed to the lid of said conventional tackle box is provided for holding a fishing pole in a stable position with a baited line in the water.

* * * * *